United States Patent [19]
Blank et al.

[11] Patent Number: 5,842,208
[45] Date of Patent: Nov. 24, 1998

[54] HIGH PERFORMANCE RECOVER/BUILD INDEX SYSTEM BY UNLOADING DATABASE FILES IN PARALLEL

[75] Inventors: Ted E. Blank, San Jose; John Marland Garth; James Alan Ruddy, both of Gilroy; Bryan Frederick Smith, Morgan Hill, all of Calif.

[73] Assignee: International Business Machines Corporation, Armonk, N.Y.

[21] Appl. No.: 838,647

[22] Filed: Apr. 9, 1997

[51] Int. Cl.⁶ ................................................... G06F 7/00
[52] U.S. Cl. ................ 707/7; 707/2; 707/3; 707/101; 707/200
[58] Field of Search ............... 707/7, 2, 3, 200, 707/101

[56] References Cited

U.S. PATENT DOCUMENTS

| | | | |
|---|---|---|---|
| 5,146,590 | 9/1992 | Lorie et al. | 707/7 |
| 5,222,235 | 6/1993 | Hintz et al. | 707/8 |
| 5,548,770 | 8/1996 | Bridges | 707/2 |
| 5,551,027 | 8/1996 | Choy et al. | 707/201 |
| 5,579,515 | 11/1996 | Hintz et al. | 707/7 |
| 5,721,928 | 2/1998 | Umehara et al. | 395/706 |
| 5,742,809 | 4/1998 | Reiner et al. | 707/3 |

OTHER PUBLICATIONS

Iyer et al., "An efficient multiprocessor merge algorithm", IEEE comput. Soc. Press, pp. 276–283, Mar. 1990.

*Primary Examiner*—Thomas G. Black
*Assistant Examiner*—Jean R. Homere
*Attorney, Agent, or Firm*—Merchant, Gould, Smith, Edell, Welter, & Schmidt

[57] ABSTRACT

A method, apparatus, and article of manufacture for a computer implemented recover/build index system. The recover/build index system builds a database index for a database file by scanning partitions of the database file in parallel to retrieve key values and their associated record identifier (rid) values. The recover/build index system then sorts the scanned key/rid values for each partition in parallel. Next, the recover/build index system performs one or more merges on the sorted key/rid values from all of the partitions to generate a single key/rid value stream. Finally, the recover/build index system builds the index using the single key/rid value stream.

13 Claims, 4 Drawing Sheets

HIGH PERFORMANCE RECOVER/BUILD INDEX SYSTEM BY UNLOADING DATABASE FILES IN PARALLEL

BACKGROUND OF THE INVENTION

1. Field of the Invention

This invention relates in general to computer-implemented recover/build index systems, and in particular to high performance recover/build index systems by unloading database files in parallel.

2. Description of Related Art

An index is an ordered set of references to the records or rows in a database file or table. The index is used to access each record in the file using a key (i.e., one of the fields of the record or attributes of the row). However, building an index for a large file can take a considerable amount of elapsed time. The process involves scanning all records in the file, extracting a key value and record identifier (rid) value from each of the records, sorting all of the key/rid values, and then building the index from the sorted key/rid values. Typically, the scanning, sorting, and index build steps are performed serially, which can be time consuming in the case of a large database file.

Additionally, when computer systems fail, the index could be corrupted or destroyed. In this case, recovery of the index, which involves rebuilding the index, can be very time consuming. Therefore, there is a need in the art for techniques that building indices more efficiently.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented recover/build index system. In accordance with the present invention, the recover/build index system builds an index for a file by scanning partitions of the file in parallel to retrieve key/rid values. The recover/build index system then sorts the scanned key/rid values for each partition in parallel. Next, the recover/build index system performs one or more merges on the sorted key/rid values from all of the partitions to generate a single key value stream. Finally, the recover/build index system builds the index using the single key/rid value stream.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
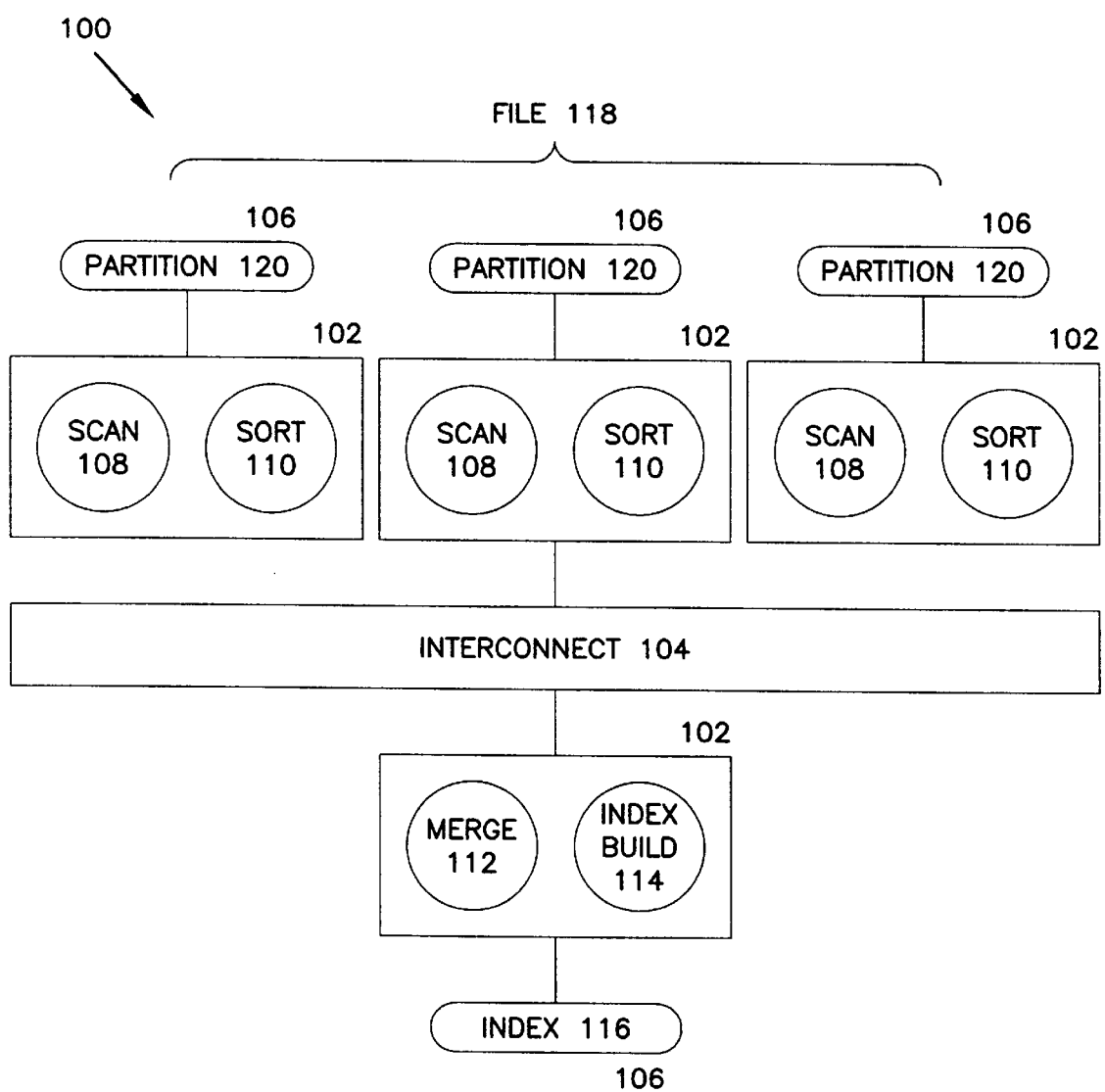
FIG. 1 is a block diagram illustrating an exemplary hardware environment used to implement the preferred embodiment of the invention.

FIG. 1 is a block diagram illustrating an exemplary hardware environment used to implement the preferred embodiment of the invention. In the exemplary environment, a computer system 100 is comprised of one or more processors 102 coupled via an interconnect 104. One or more peripheral devices 106, including fixed and/or removable data storage devices such as a hard disk, floppy disk, CD-ROM, tape, etc., may be coupled to each of processors 102.

The present invention is typically implemented using a number of computer programs executed in parallel by the processors 102, including scan programs 108, sort programs 110, merge programs 112, and index build programs 114. Using these computer programs, the present invention builds an index 116 for a database file 118 having one or more partitions 120, all of which are stored in one or more of the data storage devices 106. Preferably, each of the partitions 120 is scanned in parallel by the scan programs 108 and the scanning results are then sorted in parallel by the sort programs 110, in order to enhance the performance of the system.

The scan 108, sort 110, merge 112, and index build 114 computer programs all execute under the control of an operating system, such as MVS, AIX, OS/2, WINDOWS NT, WINDOWS, UNIX, etc. Further, the scan 108, sort 110, merge 112, and index build 114 computer programs are all tangibly embodied in or readable from a computer-readable medium, e.g. one or more of the data storage devices 106 and/or data communications devices coupled to the computer system 100. Moreover, the scan 108, sort 110, merge 112, and index build 114 computer programs are all comprised of instructions which, when read and executed by the processors 102, cause the processors 102 to perform the steps necessary to implement and/or use the present invention.

Those skilled in the art will recognize that any combination of the above components, or any number of different components, peripherals, and other devices, may be used to implement the present invention. For example, the present invention may implemented on lesser or greater numbers of processors 102 without departing from the scope of the present invention. Further, the number and configuration of the scan 108, sort 110, merge 112, and index build 114 computer programs may be altered without departing from the scope of the present invention. Finally, the structure of the index 116, file 118, and/or partitions 120 may be altered without departing from the scope of the present invention.

Logic

Figure 2:
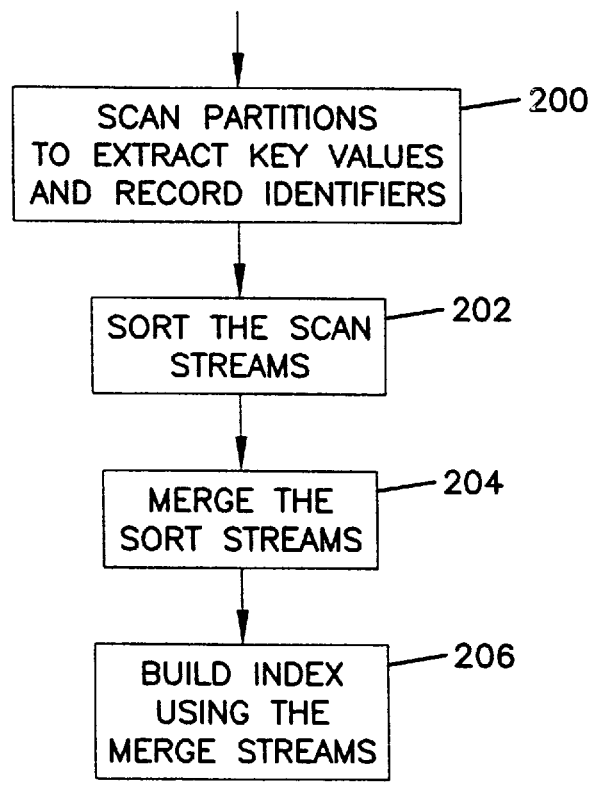
FIG. 2 is a flowchart illustrating the general logic of the recover/build index system according to the present invention.

FIG. 2 is a flowchart illustrating the general logic of the recover/build index system according to the present invention. The recover/build index system of the present invention builds an index 116 by scanning or unloading partitions 120 of the file 118 in parallel.

In step 200, concurrent scan programs 108 are used to scan every record of each partition 120. The scan programs 108 executing in parallel extract key values (of a particular key) and record identifiers (rids) or pointers from the partitions 120 to create a key/rid or scan stream for each partition 112. While the scan programs 108 are scanning the partitions 120, the file 118 can still be read by other programs. The parallel scan programs 108 pass the scan streams to the sort programs 110.

In step 202, the sort programs 110 executing in parallel receive the scan streams for each partition 120 and create a sort stream therefrom, and then pass the sort stream to the merge program 112. Each sort program 110 can accept a scan stream from one or more scan programs 108.

In step 204, the merge program 112 merges the sort streams received from the sort programs 110 to create a merge stream. The merge program 112 accepts the sort streams from two or more sort programs 110. The merge program 112 then passes the merge stream to an index build program 114.

In step 206, the index build program 114 builds the index 116 from the merge stream received from the merge program 112. The index 116 is built in a compact and compressed manner, because the key values are sorted. As a result, complete blocks or pages of sequential key/rid values can be written to the index 116 and the index build program 114 improves the efficiency of I/O and improves the final organization of the index 116.

Moreover, by performing many of the steps for building the index 116 in parallel, the high performance recover/build index system reduces the amount of time that it takes to build an index 116. Additionally, the recover/build index system can exploit the use of multiple processors 102. Additionally, piping the data between the sort 110 and merge 112 programs improves performance. Intermediate communication or intermediate files are used to transfer data between the sort 110, merge 112, and index build 114 programs.

Additionally, after scanning the partitions 120 to extract key values and record identifiers, this information is written to a file on a data storage device 106. Then, in case of system failure, the index 116 can be quickly rebuilt using the steps discussed above.

Dataflow Diagrams

Figure 3:
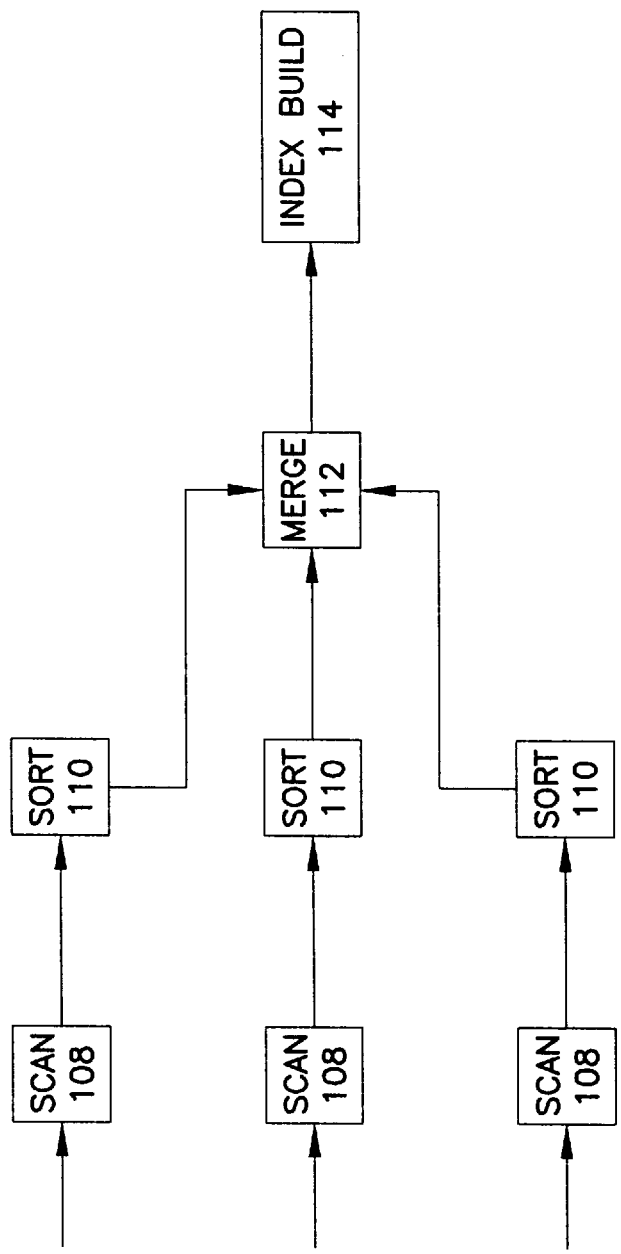
FIG. 3 is a dataflow diagram that illustrates the operation of a first embodiment of the recover/build index system according to the present invention.

FIG. 3 is a dataflow diagram that illustrates the operation of a first embodiment of the recover/build index system according to the present invention. In this embodiment, the recover/build index system includes multiple scan programs 108 that are performed in parallel by multiple processors 102 against multiple partitions 120 of one file 118 to extract key/rid values. Similarly, sort programs 110 are performed in parallel to sort the extracted key/rid values. Thereafter, one or more merge programs 112 are performed to merge the key/rid values received from the sort programs 110. Finally, an index build program 114 is performed using a single stream of key/rid values from the merge programs 112 to build the index 116.

Figure 4:
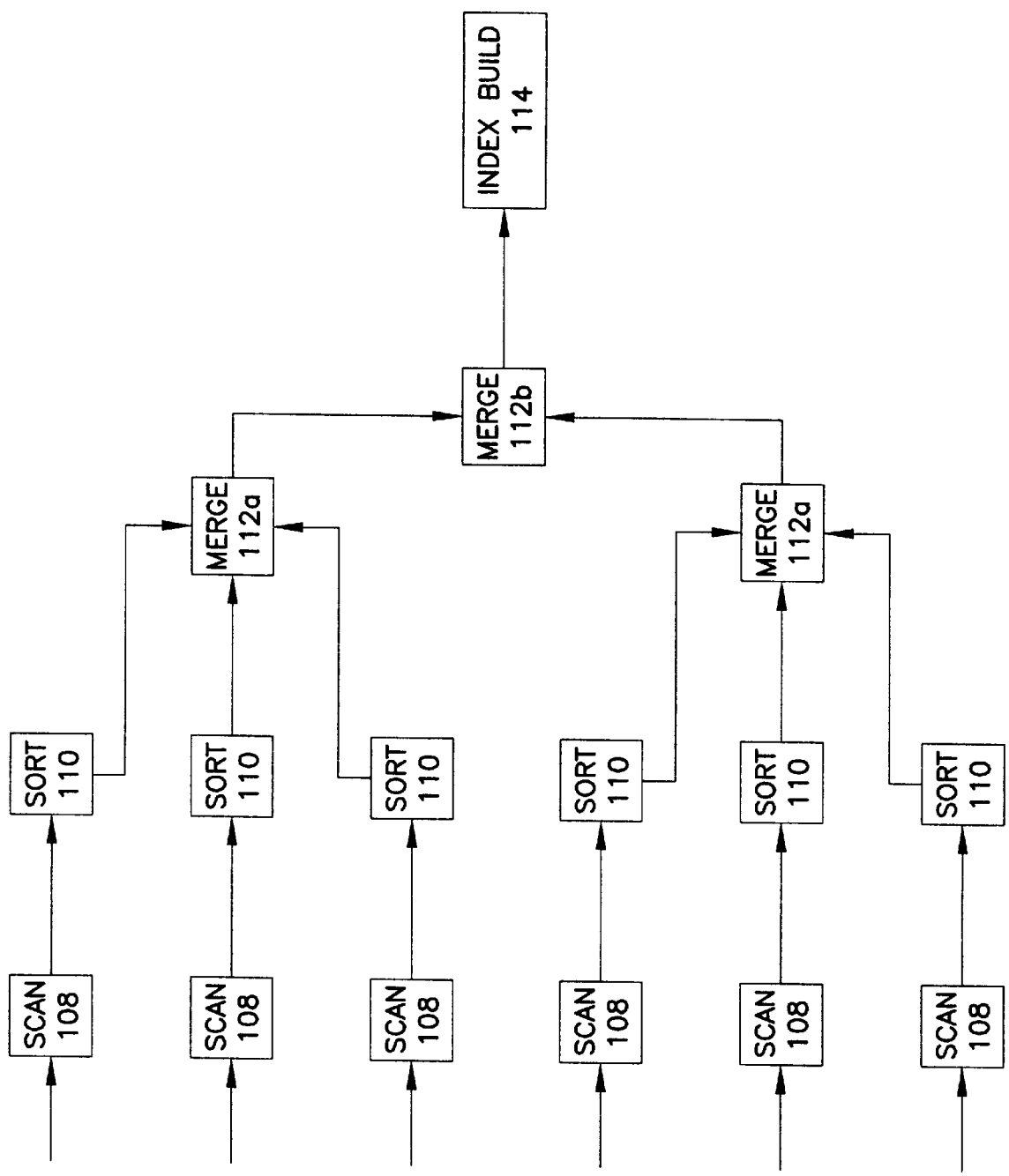
FIG. 4 is a dataflow diagram that illustrates the operation of a second embodiment of the recover/build index system according to the present invention.

FIG. 4 is a dataflow diagram that illustrates the operation of a second embodiment of the recover/build index system according to the present invention. In this embodiment of the recover/build index system, multiple merge programs 112a–b are performed in parallel. Again, scan programs 108 are performed in parallel to retrieve key/rid values. Then, multiple sort programs 110 are performed in parallel to sort the key/rid values by their key. Next, multiple intermediate merge programs 112a are performed on the key/rid values to generate merged data streams that are forwarded to a single final merge program 112b that merges all of the key/rid values (wherein the merge programs 112a–b are referred to as nested merges). Finally, an index build program 114 is performed to build the index 116 using the merged key/rid values. If more than one index 116 is to be built, the above steps may be performed on multiple streams of different key/rid values.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for building an index for a database file, the index and file being stored in a data storage device coupled to a computer, the method comprising the steps of:

performing, in the computer, multiple scans in parallel against the file, wherein each of the multiple scans extracts a desired key value and a record identifier for each of the scanned records to create a scan stream;

performing, in the computer, multiple sorts in parallel against the scan streams to create multiple sort streams of extracted key values and record identifiers;

performing, in the computer, one or more merges in parallel of the multiple sort streams to create a single merge stream of extracted key values and record identifiers; and building, in the computer, the index for the file from the single merge stream of extracted key values and record identifiers.

2. The method of claim 1, wherein each of the multiple sorts accepts one or more of the scan streams.

3. The method of claim 1, wherein each of the merges accepts two or more of the sort streams.

4. The method of claim 1, wherein the step of performing one or more merges further comprises performing nested merges so that there are one or more intermediate merges feeding a final merge.

5. The method of claim 1 wherein the step of performing multiple scans extracts multiple key values for each record identifier for each of the scanned rows to form multiple scan streams.

6. The method of claim 5, wherein the step of performing multiple sorts comprises the step of performing multiple sorts in parallel against the multiple scan streams to create multiple sort streams of extracted key values and record identifiers.

7. The method of claim 6, wherein the step of performing one or more merges further comprises performing one or more merges of the multiple sort streams to create one or more merge streams.

8. The method of claim 7, wherein the step of building the index for the file further comprises building multiple indexes, wherein each index is based on one of the merge streams.

9. The method of claim 1, wherein the computer comprises multiple processors.

10. The method of claim 1, wherein the step of performing multiple scans further comprises writing the scanned key values to the data storage device for use in rebuilding the index.

11. The method of claim 1, wherein the step of building the index further comprises the step of writing a compressed index.

12. An apparatus for building a database index for a database table, comprising:
- a computer coupled to a data storage device for storing the database table;
- means, performed by the computer, for performing multiple scans in parallel against the file, wherein each of the multiple scans extracts a desired key value and a record identifier for each of the scanned records to create a scan stream;
- means, performed by the computer, for performing multiple sorts in parallel against the extracted key values and record identifiers to create multiple sort streams of extracted key values and record identifiers;
- means, performed by the computer, for performing one or more merges in parallel of the multiple sort streams to create a single merge stream of extracted key values and record identifiers; and
- means, performed by the computer, for building the index for the file from the single merge stream of extracted key values and record identifiers.

13. An article of manufacture comprising a program storage device readable by a computer and tangibly embodying one or more programs of instructions executable by the computer to perform method steps for building an index for a database file, the computer having a data storage device coupled thereto for storing the index and the database file, the method comprising the steps of:
- performing, in the computer, multiple scans in parallel against the file, wherein each of the multiple scans extracts a desired key value and a record identifier for each of the scanned records to create a scan stream;
- performing, in the computer, multiple sorts in parallel against the scan streams to create multiple sort streams of extracted key values and record identifiers;
- performing, in the computer, one or more merges in parallel of the multiple sort streams to create a single merge stream of extracted key values and record identifiers; and
- building, in the computer, the index for the file from the single merge stream of extracted key values and record identifiers.

* * * * *

UNITED STATES PATENT AND TRADEMARK OFFICE
CERTIFICATE OF CORRECTION

PATENT NO. : 5,842,208
DATED : Nov. 24, 1998
INVENTOR(S) : Ted E. Blank, et al.

It is certified that error appears in the above-identified patent and that said Letters Patent is hereby corrected as shown below:

The title page should be deleted to appear as per attached title page.

Please delete columns 5 & 6 and substitute columns 5 & 6 adding the following claims 14-33 as per attached.

Signed and Sealed this

Twenty-ninth Day of August, 2000

Attest:

Attesting Officer

Q. TODD DICKINSON
Director of Patents and Trademarks

United States Patent [19]

Blank et al.

[11] Patent Number: 5,842,208

[45] Date of Patent: Nov. 24, 1998

[54] HIGH PERFORMANCE RECOVER/BUILD INDEX SYSTEM BY UNLOADING DATABASE FILES IN PARALLEL

[75] Inventors: Ted E. Blank, San Jose; John Marland Garth; James Alan Ruddy, both of Gilroy; Bryan Frederick Smith, Morgan Hill, all of Calif.

[73] Assignee: International Business Machines Corporation, Armonk, N.Y.

[21] Appl. No.: 838,647

[22] Filed: Apr. 9, 1997

[51] Int. Cl.$^6$ .................................................. G06F 7/00
[52] U.S. Cl. ................... 707/7; 707/2; 707/3; 707/101; 707/200
[58] Field of Search ............................ 707/7, 2, 3, 200, 707/101

[56] References Cited

U.S. PATENT DOCUMENTS

| | | | |
|---|---|---|---|
| 5,146,590 | 9/1992 | Lorie et al. | 707/7 |
| 5,222,235 | 6/1993 | Hintz et al. | 707/8 |
| 5,548,770 | 8/1996 | Bridges | 707/2 |
| 5,551,027 | 8/1996 | Choy et al. | 707/201 |
| 5,579,515 | 11/1996 | Hintz et al. | 707/7 |
| 5,721,928 | 2/1998 | Umehara et al. | 395/706 |
| 5,742,809 | 4/1998 | Reiner et al. | 707/3 |

OTHER PUBLICATIONS

Iyer et al., "An efficient multiprocessor merge algorithm", IEEE comput. Soc. Press, pp. 276–283, Mar. 1990.

Primary Examiner—Thomas G. Black
Assistant Examiner—Jean R. Homere
Attorney, Agent, or Firm—Merchant, Gould, Smith, Edell, Welter, & Schmidt

[57] ABSTRACT

A method, apparatus, and article of manufacture for a computer implemented recover/build index system. The recover/build index system builds a database index for a database file by scanning partitions of the database file in parallel to retrieve key values and their associated record identifier (rid) values. The recover/build index system then sorts the scanned key/rid values for each partition in parallel. Next, the recover/build index system performs one or more merges on the sorted key/rid values from all of the partitions to generate a single key/rid value stream. Finally, the recover/build index system builds the index using the single key/rid value stream.

33 Claims, 4 Drawing Sheets

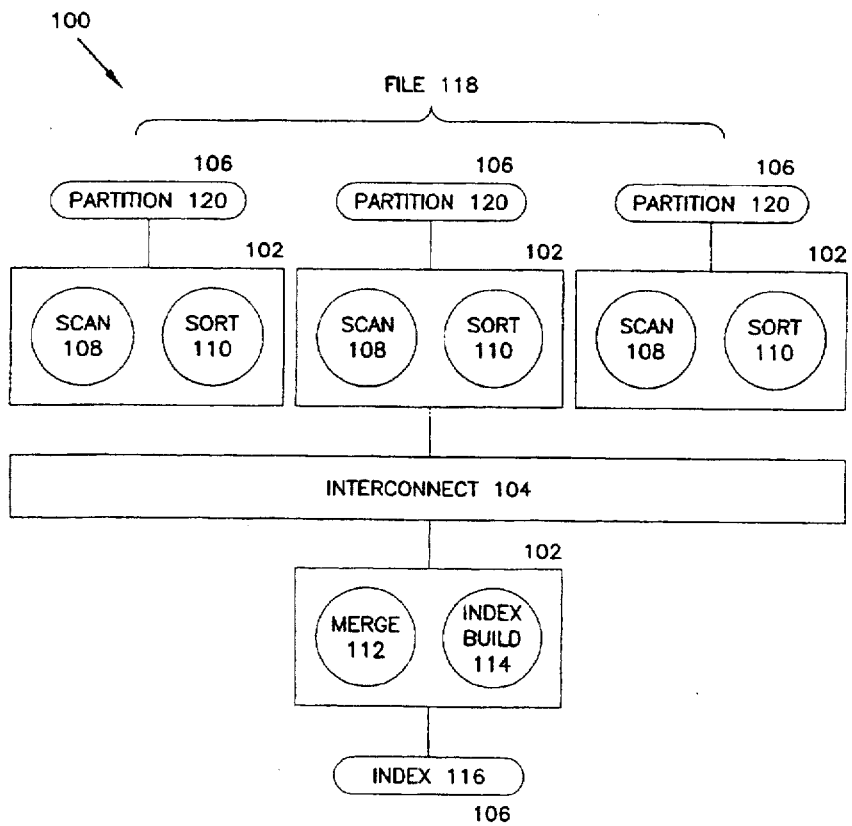

12. An apparatus for building a database index for a database table, comprising:

a computer coupled to a data storage device for storing the database table;

means, performed by the computer, for performing multiple scans in parallel against the file, wherein each of the multiple scans extracts a desired key value and a record identifier for each of the scanned records to create a scan stream;

means, performed by the computer, for performing multiple sorts in parallel against the extracted key values and record identifiers to create multiple sort streams of extracted key values and record identifiers;

means, performed by the computer, for performing one or more merges in parallel of the multiple sort streams to create a single merge stream of extracted key values and record identifiers; and means, performed by the computer, for building the index for the file from the single merge stream of extracted key values and record identifiers.

13. An article of manufacture comprising a program storage device readable by a computer and tangibly embodying one or more programs of instructions executable by the computer to perform method steps for building an index for a database file, the computer having a data storage device coupled thereto for storing the index and the database file, the method comprising the steps of:

performing, in the computer, multiple scans in parallel against the file, wherein each of the multiple scans extracts a desired key value and a record identifier for each of the scanned records to create a scan stream;

performing, in the computer, multiple sorts in parallel against the scan streams to create multiple sort streams of extracted key values and record identifiers;

performing, in the computer, one or more merges in parallel of the multiple sort streams to create a single merge stream of extracted key values and record identifiers; and building, in the computer, the index for the file from the single merge stream of extracted key values and record identifiers.

14. The apparatus of claim 12, wherein each of the multiple sorts accepts one or more of the scan streams.

15. The apparatus of claim 12, wherein each of the merges accepts two or more of the sort streams.

16. The apparatus of claim 12, wherein the means for performing one or more merges further comprises means for performing nested merges so that the are one or more intermediate merges feeding a final merge.

17. The apparatus of claim 12, wherein the means for performing multiple scans further comprises means for extracting multiple key values for each record identifier for each of the scanned rows to form multiple scan streams.

18. The apparatus of claim 17, wherein the means for performing multiple sorts comprises the means for performing multiple sorts in parallel against the multiple scan streams to create multiple sort streams of extracted key values and record identifiers.

19. The apparatus of claim 18, wherein the means for performing one or more merges further comprises means for performing one or more merges of the multiple sort streams to create one or more merge streams.

20. The apparatus of claim 19, wherein the means for building the index for the file further comprises means for building multiple indexes, wherein each index is based on one of the merge streams.

21. The apparatus of claim 12, wherein the computer comprises multiple processors.

22. The apparatus of claim 12, wherein the means for performing multiple scans further comprises means for writing the scanned key values to the data storage device for use in rebuilding the index.

23. The apparatus of claim 12, wherein the means for building the index further comprises the means for writing a compressed index.

24. The article of manufacture of claim 13, wherein each of the multiple sorts accepts one or more of the scan streams.

25. The article of manufacture of claim 13, wherein each of the merges accepts two or more of the sort streams.

26. The article of manufacture of claim 13, wherein the step of performing one or more merges further comprises performing nested merges so that there are one or more intermediate merges feeding a final merge.

27. The article of manufacture of claim 13, wherein the step of performing multiple scans extracts multiple key values for each record identifier for each of the scanned rows to form multiple scan streams.

28. The article of manufacture of claim 27, wherein the step of performing multiple sorts comprises the step of performing multiple sorts in parallel against the multiple scan streams to create multiple sort streams of extracted key values and record identifiers.

29. The method of claim 28, wherein the step of performing one or more merges further comprises performing one or more merges of the multiple sort streams to create one or more merge streams.

30. The article of manufacture of claim 29, wherein the step of building the index for the file further comprises building multiple indexes, wherein each index is based on one of the merge streams.

31. The article of manufacture of claim 13, wherein the computer comprises multiple processors.

32. The article of manufacture of claim 13, wherein the step of performing multiple scans further comprises writing the scanned key values to the data storage device for use in rebuilding the index.

33. The article of manufacture of claim 13, wherein the step of building the index further comprises the step of writing a compressed index.

* * * * *